(12) United States Patent
Kim et al.

(10) Patent No.: US 8,583,816 B2
(45) Date of Patent: Nov. 12, 2013

(54) SYSTEM FOR PROVIDING STREAMING-BASED PORTABLE APPLICATION UNDER SELECTIVE CONDITIONS

(75) Inventors: Won Young Kim, Daejeon (KR); Won Hyuk Choi, Daejeon (KR); Sung Jin Hur, Daejeon (KR); Wan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 620 days.

(21) Appl. No.: 12/808,496

(22) PCT Filed: Dec. 5, 2008

(86) PCT No.: PCT/KR2008/007223
§ 371 (c)(1),
(2), (4) Date: Jun. 16, 2010

(87) PCT Pub. No.: WO2009/078610
PCT Pub. Date: Jun. 25, 2009

(65) Prior Publication Data
US 2010/0268842 A1 Oct. 21, 2010

(30) Foreign Application Priority Data
Dec. 18, 2007 (KR) .......................... 10-2007-0133590

(51) Int. Cl.
*G06F 15/16* (2006.01)
(52) U.S. Cl.
USPC ............ 709/231; 709/202; 709/219; 709/222
(58) Field of Classification Search
USPC .................. 709/231, 202, 219, 222
See application file for complete search history.

(56) References Cited

U.S. PATENT DOCUMENTS

| 6,311,221 B1* | 10/2001 | Raz et al. ...................... 709/231 |
| 6,574,618 B2* | 6/2003 | Eylon et al. ........................... 1/1 |
| 6,857,012 B2* | 2/2005 | Sim et al. ...................... 709/222 |
| 7,051,315 B2* | 5/2006 | Artzi et al. .................... 717/103 |
| 7,062,567 B2* | 6/2006 | Benitez et al. ................ 709/231 |
| 7,146,610 B2  | 12/2006 | Shen |
| 7,197,570 B2* | 3/2007 | Eylon et al. .................. 709/231 |
| 7,366,460 B2* | 4/2008 | O'Farrell et al. ............ 455/3.06 |

(Continued)

FOREIGN PATENT DOCUMENTS

| KR | 1020060062587 A | 6/2006 |
| KR | 1020070061121 A | 6/2007 |

OTHER PUBLICATIONS

International Search Report for PCT/KR2008/007223 filed Dec. 5, 2008.

(Continued)

*Primary Examiner* — Phuoc Nguyen
*Assistant Examiner* — Daniel C Murray

(57) ABSTRACT

Provided are a system and method for providing a streaming-based portable application, which can add and update a portable application in one click, without separate procedures, by using advantages of application streaming while maintaining advantages of a portable application. In the system, a streaming server stores an application execution code provided at the inside of the system. A client provides a virtualization of an execution code necessary to execute an application process, streams an execution code from the streaming server through a network, and manages application streamed images.

2 Claims, 4 Drawing Sheets

(56) References Cited

U.S. PATENT DOCUMENTS

| | | | |
|---|---|---|---|
| 7,426,661 B2* | 9/2008 | Schaefer | 714/38.1 |
| 7,917,533 B2* | 3/2011 | Nagami et al. | 707/785 |
| 8,190,682 B2* | 5/2012 | Paterson-Jones et al. | 709/205 |
| 8,230,095 B2* | 7/2012 | Tsui et al. | 709/231 |
| 8,359,591 B2* | 1/2013 | de Vries et al. | 717/172 |
| 8,380,808 B2* | 2/2013 | O'Brien | 709/217 |
| 8,418,181 B1* | 4/2013 | Sirota et al. | 718/102 |
| 8,434,093 B2* | 4/2013 | Larimore et al. | 719/312 |
| 8,438,298 B2* | 5/2013 | Arai et al. | 709/231 |
| 8,478,789 B2* | 7/2013 | O'Farrell et al. | 707/802 |
| 2001/0037399 A1* | 11/2001 | Eylon et al. | 709/231 |
| 2001/0044850 A1* | 11/2001 | Raz et al. | 709/231 |
| 2002/0042833 A1* | 4/2002 | Hendler et al. | 709/231 |
| 2002/0091763 A1* | 7/2002 | Shah et al. | 709/203 |
| 2002/0161908 A1* | 10/2002 | Benitez et al. | 709/231 |
| 2003/0046369 A1* | 3/2003 | Sim et al. | 709/220 |
| 2003/0061323 A1* | 3/2003 | East et al. | 709/223 |
| 2003/0140160 A1* | 7/2003 | Raz et al. | 709/231 |
| 2005/0044164 A1* | 2/2005 | O'Farrell et al. | 709/213 |
| 2005/0044165 A1* | 2/2005 | O'Farrell et al. | 709/213 |
| 2005/0066324 A1 | 3/2005 | Delgado et al. | |
| 2005/0160251 A1* | 7/2005 | Zur et al. | 712/1 |
| 2006/0020858 A1* | 1/2006 | Schaefer | 714/38 |
| 2006/0031547 A1* | 2/2006 | Tsui et al. | 709/231 |
| 2006/0053057 A1* | 3/2006 | Michael | 705/14 |
| 2006/0069796 A1* | 3/2006 | Lucas et al. | 709/231 |
| 2006/0080385 A1* | 4/2006 | Blandford et al. | 709/203 |
| 2006/0123185 A1* | 6/2006 | de Vries et al. | 711/100 |
| 2006/0168294 A1* | 7/2006 | de Vries et al. | 709/231 |
| 2006/0259635 A1* | 11/2006 | Hisatomi | 709/230 |
| 2008/0178298 A1* | 7/2008 | Arai et al. | 726/29 |
| 2008/0201455 A1* | 8/2008 | Husain | 709/220 |
| 2008/0201479 A1* | 8/2008 | Husain et al. | 709/227 |
| 2008/0201711 A1* | 8/2008 | Amir Husain | 718/1 |
| 2009/0070404 A1* | 3/2009 | Mazzaferri | 709/202 |
| 2009/0070687 A1* | 3/2009 | Mazzaferri | 715/751 |
| 2009/0094365 A1* | 4/2009 | Orady et al. | 709/226 |
| 2010/0107113 A1* | 4/2010 | Innes et al. | 715/779 |
| 2010/0131994 A1* | 5/2010 | O'Brien | 725/93 |
| 2010/0138828 A1* | 6/2010 | Hanquez et al. | 718/1 |
| 2011/0161404 A1* | 6/2011 | Ekstrom et al. | 709/203 |
| 2011/0246617 A1* | 10/2011 | Sheehan et al. | 709/219 |
| 2011/0247039 A1* | 10/2011 | Cheng et al. | 725/52 |
| 2012/0278439 A1* | 11/2012 | Ahiska et al. | 709/218 |
| 2013/0081009 A1* | 3/2013 | de Vries et al. | 717/172 |
| 2013/0178241 A1* | 7/2013 | Duggirala et al. | 455/550.1 |

OTHER PUBLICATIONS

Written Opinion of the International Searching Authority for PCT/KR2008/007223 filed Dec. 5, 2008.

\* cited by examiner

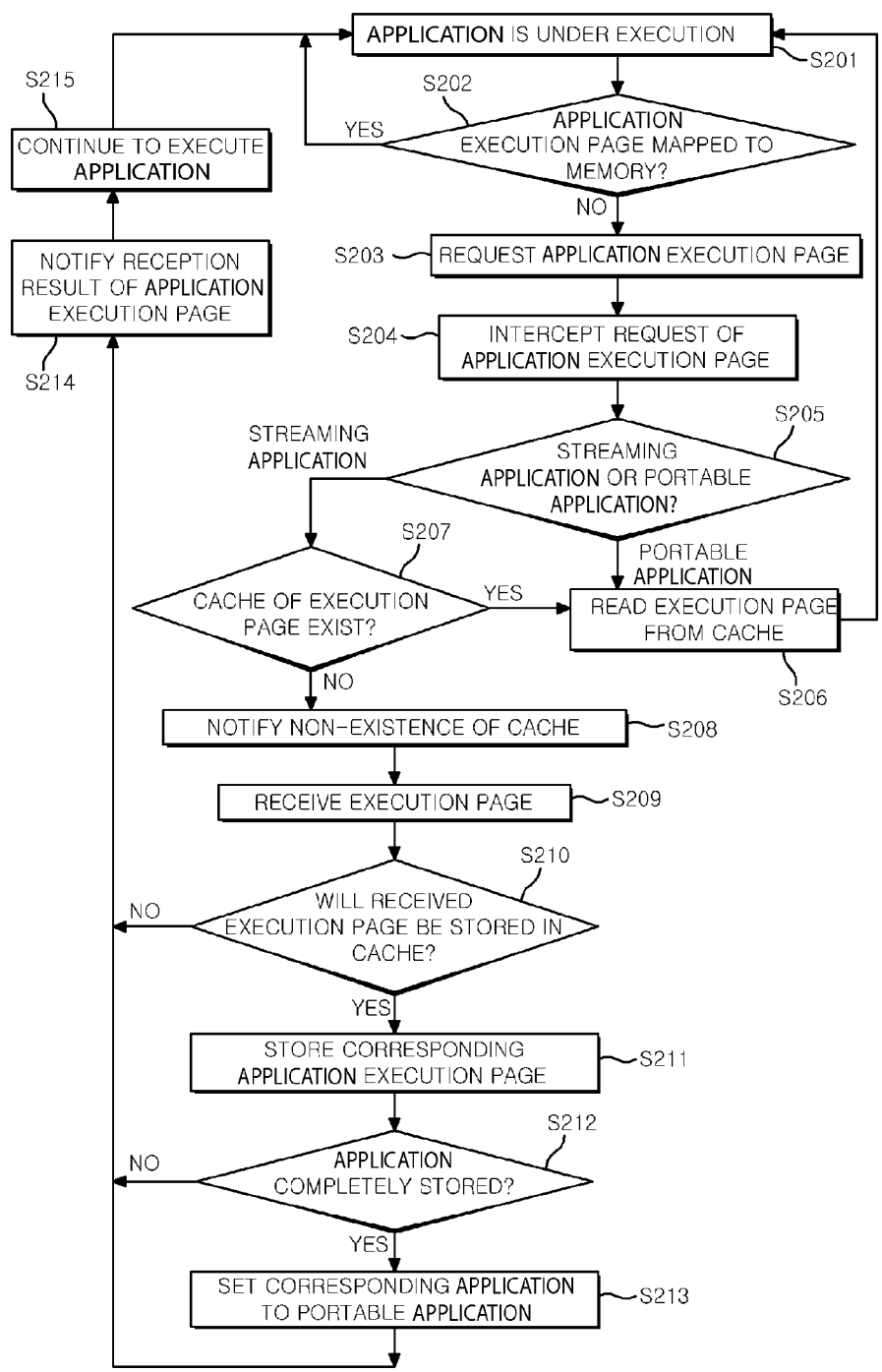

SYSTEM FOR PROVIDING STREAMING-BASED PORTABLE APPLICATION UNDER SELECTIVE CONDITIONS

TECHNICAL FIELD

The present disclosure relates to a system and method for providing a streamingbased portable application, and more particularly, to a system and method for providing a portable application, which can add and update a portable application in one click, without separate procedures, by using advantages of application streaming while maintaining advantages of a portable application.

This work was supported by the IT R&D program of MIC/IITA. [2007-S-015-01, Development of a Personalized SW Service Platform on Movable Disk Devices]

BACKGROUND ART

A portable application technology is a technology that enables the immediate use of an application without installation when a portable storage device having the application is connected to a computer. In other words, when there is the portable storage device, this technology makes it possible to use the application in the portable storage device at any time and at any place. Therefore, users can set up their desired environments even though they are on a business trip or moving from home to office. However, when users want to add a new portable application or to update the existing portable application, they must connect to a server of providing portable applications to select a desired application, and download an entire application program to thereby copy or install it on the portable storage device.

Meanwhile, a streaming-based application technology is a technology that directly executes an application stored in a server on a user's computer, and makes it possible that users execute an application without download or installation for the use of the application. Using this technology, users can test whether a new application is suitable for them, without download or installation, and can conveniently manage applications. This technology users can very easily establish the same computing environments on several computers. However, since this technology is premised on the presence of the server, it cannot be used in an environment where there is no connection to the server.

DISCLOSURE OF INVENTION

Technical Problem

Therefore, an object of the present invention is to provide a system and method for providing a portable application, which can add and update a portable application in one click, without separate procedures, by using advantages of application streaming while maintaining advantages of a portable application.

Another object of the present invention is to provide a system and method for providing a portable application, which can add and update the portable application in one click, without separate procedures, thereby providing convenient management environment of the portable application.

Technical Solution

To achieve these and other advantages and in accordance with the purpose(s) of the present invention as embodied and broadly described herein, a system for providing a streaming-based portable application in accordance with an aspect of the present invention includes: a streaming server for storing the entire execution code of the applications provided and a client engine for providing virtualization of an execution code necessary to execute an application, streaming execution code from the streaming server through a network, and managing streamed application codes.

To achieve these and other advantages and in accordance with the purpose(s) of the present invention, a client engine of a system for providing a streaming-based portable application in accordance with another aspect of the present invention includes: a portable application kernel engine for providing a virtualization of an execution code necessary to execute an application; an application manager for managing streamed application codes and an application streaming manager for streaming an execution code from a streaming server according to a request of the portable application engine or the application manager.

To achieve these and other advantages and in accordance with the purpose(s) of the present invention, a method for providing a streaming-based portable application in accordance with another aspect of the present invention includes: preparing for execution of a portable application when a type of a requested application is the portable application, and executing the application; preparing for an execution request of application streaming when the type of the requested application is the application streaming; requesting a on-demand streaming to a streaming server, and executing an application according to a stored state of an application, an availability of a network, and an application streaming type; and requesting an entire streaming according to the stored state of the application, the availability of the network, and the application streaming type, streaming the entire application, and simultaneously executing the application.

To achieve these and other advantages and in accordance with the purpose(s) of the present invention, a method for providing a streaming-based portable application in accordance with another aspect of the present invention includes: reading an application execution page from a cache when an execution application type is a portable application, and continuing to execute an application; notifying a non-existence of a cache of a corresponding execution page when the execution application type is application streaming and the corresponding execution page does not exist in the cache, requesting a streaming server to transmit the corresponding execution page through a network, and receiving the corresponding execution page; and storing the entire application in the cache, setting the corresponding application from the application streaming to the portable application, notifying the reception result of the application execution page, and continuing to execute the application.

The foregoing and other objects, features, aspects and advantages of the present invention will become more apparent from the following detailed description of the present invention when taken in conjunction with the accompanying drawings.

Advantageous Effects

The system and method for providing the streaming-based portable application according to the embodiments of the present invention can add and update the portable application in one click, without separate procedures, by using advantages of application streaming while maintaining advantages of the portable application, thereby providing convenient management environment of the portable application.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a flowchart illustrating a method for providing a streaming-based portable application at a kernel level of an operating system.

BEST MODE FOR CARRYING OUT THE INVENTION

Hereinafter, specific embodiments will be described in detail with reference to the accompanying drawings.

Figure 1:
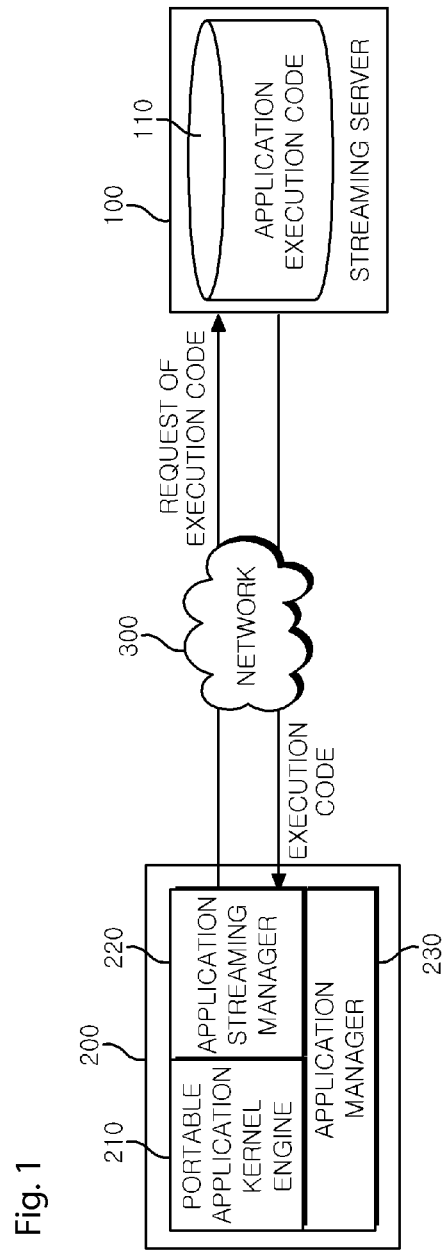
FIG. 1 illustrates the architecture of a system for providing a streaming-based portable application according to an embodiment of the present invention.

FIG. 1 illustrates the architecture of a system for providing a streaming-based portable application streaming according to an embodiment of the present invention.

Referring to FIG. 1, the system for providing the streaming-based portable application according to the embodiment of the present invention includes a streaming server 100 for storing an application execution code 110 provided at the inside of the system, a client engine 200 for receiving the execution code from the streaming server 100, and a network 300 for connecting the streaming server 100 to the client engine 200.

When the client engine 200 requests the execution code through the network 300, the streaming server 100 provides the execution code which it maintains to the client engine 200 through the network 300.

The client engine 200 includes a portable application kernel engine 210 for executing a portable application service, an application streaming manager 220 for streaming a new application, and an application manager 230 for managing streamed application images.

The portable application kernel engine 210 provides a virtualization of the execution code necessary to execute an application process.

The application streaming manager 220 requests the execution code to the streaming server 100 according to the request of the portable application kernel engine 210 or the application manager 230, and streams the requested application execution code 110 from the streaming server 100.

The application manager 230 manages the portable application such that an initial execution of the portable application is differently performed according to conditions.

Figure 2:
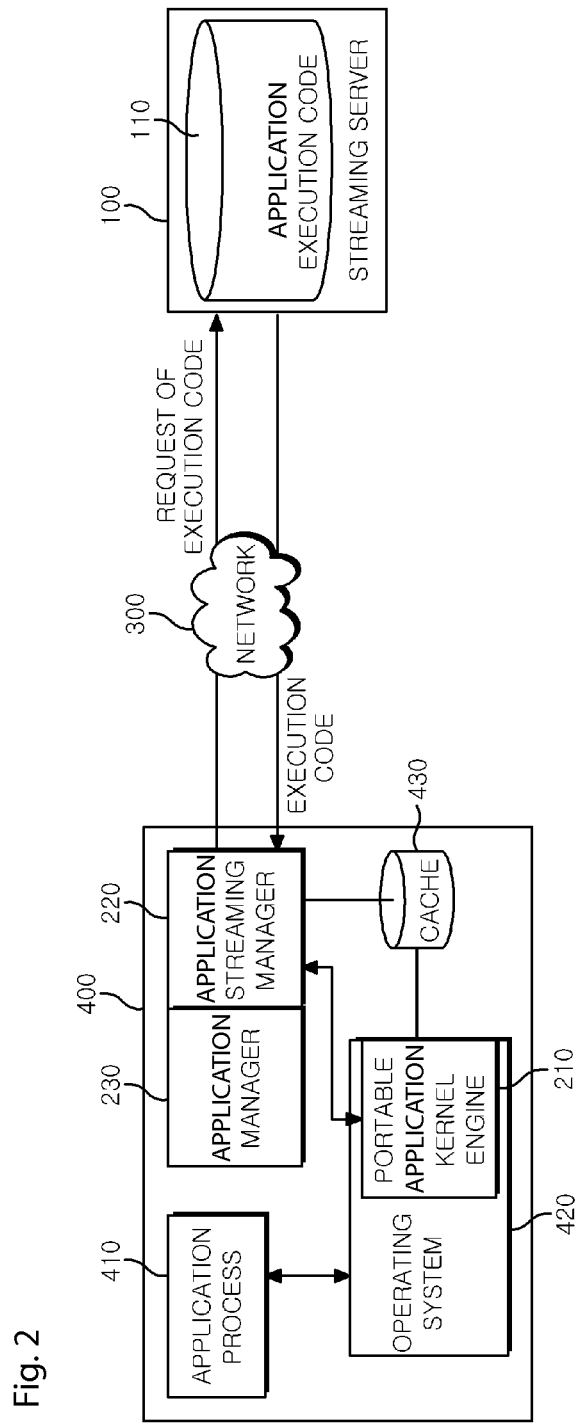
FIG. 2 illustrates the architecture of a system for providing a streaming-based portable application according to an embodiment of the present invention, in which the system includes a client with the built-in client engine of FIG. 1.

FIG. 2 illustrates the architecture of a system for providing a streaming-based portable application according to an embodiment of the present invention inclusive of a client with the built-in client engine of FIG. 1.

Referring to FIG. 2, the client 400 includes a client engine 200, an application process 410, an operating system 420, and a cache 430. The client 400 is connected to the streaming server 100 through a network 300.

A portable application kernel engine 210, which provides the virtualization of the execution code necessary to execute the application process 410, is included in the operating system 420 to operate. At this time, an application manger 230 manages the portable application such that an initial execution of the portable application is differently performed according to conditions, for example, a case where the portable application is completely stored in the cache 430, a case where the portable application is not completely stored, a case where the user wants to stream the execution code of the portable application at a time, and a case where the user wants to stream the execution code of the portable application whenever necessary. The application streaming manager 220 requests the execution code to the streaming server 100 according to the request of the portable application kernel engine 210 or the application manager 230, and streams the requested application execution code 110 from the streaming server 100.

Figure 3:
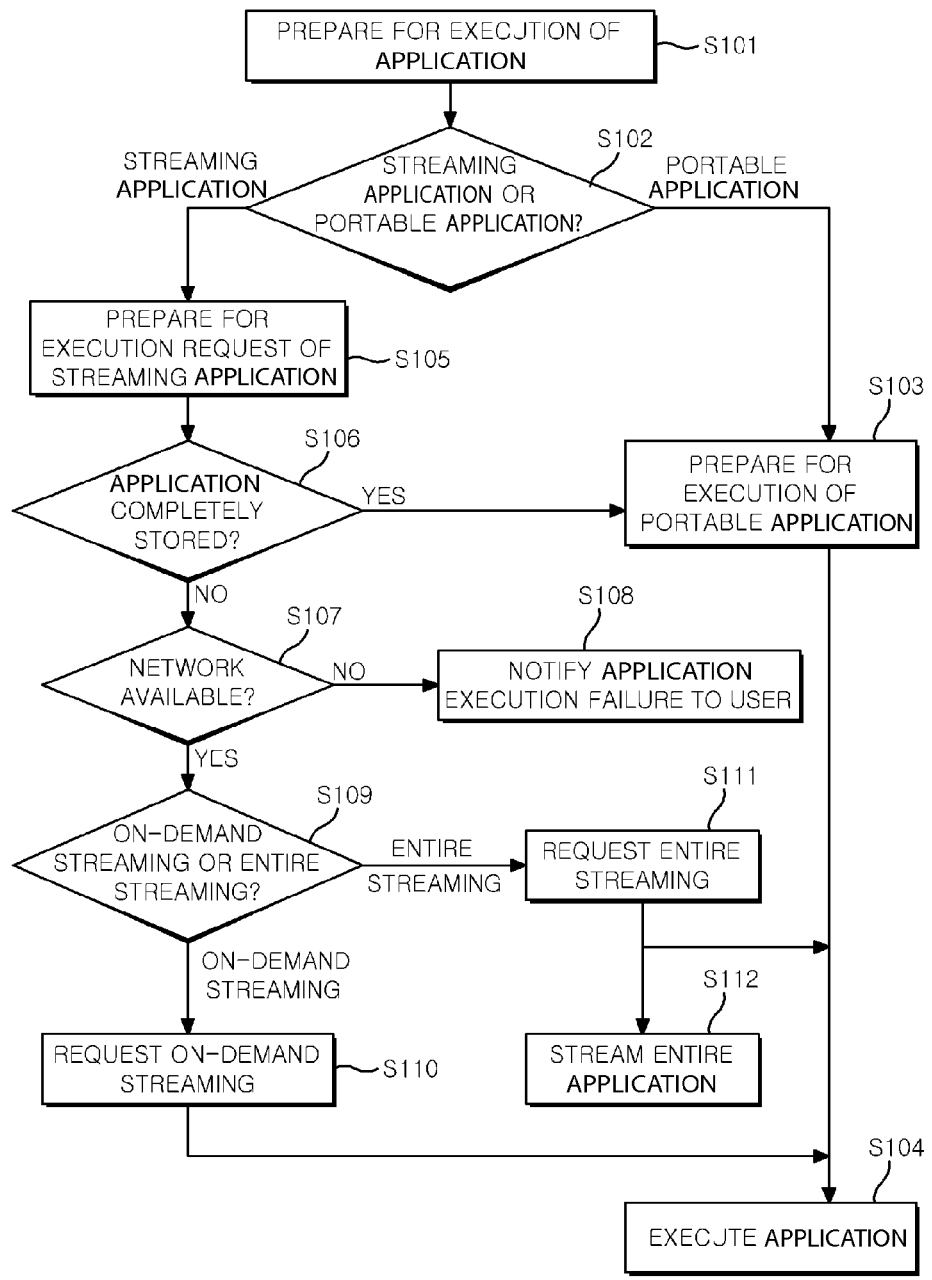
FIG. 3 is a flowchart illustrating a method for providing a streaming-based portable application according to an embodiment of the present invention.

FIG. 3 is a flowchart illustrating a method for providing a streaming-based portable application according to an embodiment of the present invention under an user level.

Referring to FIG. 3, when the user executes an application, the application manager 230 prepares for execution of the application in operation S101. In operation S102, the application manager 230 determines whether the type of the requested application is application streaming or a portable application.

In operations S103 and S104, when the type of the requested application is determined as the portable application, the application manager 230 prepares for execution of the application and executes the application.

In operations S105 and S106, when the type of the requested application is determined as the application streaming, the application streaming manager 220 prepares for an execution request of the application streaming and determines whether the application streaming is completely stored or not. When it is determined that the application streaming is completely stored, the application manager 230 proceeds to operation S103 to prepare for execution of the application.

In operation S107, when it is determined that the application streaming is not completely stored, the application streaming manager 220 searches whether the network 300 is available so as to stream the application from the streaming server 100. In operation S108, when it is determined that the network 300 is not available, the application streaming manager 220 notifies an application execution failure to the user.

In operation S109, when it is determined that the network 300 is available, the application streaming manager 220 searches the application streaming type and determines whether the application streaming type is a on-demand streaming or an entire streaming. In operation S110, when the application streaming type is determined as the on-demand streaming, the application streaming manager 220 requests the on-demand streaming, which receives only application image blocks necessary to execute the current application, to the streaming server 100, and then proceeds to the operation S104 to execute the application.

In operation S111, when the application streaming type is determined as the entire streaming in operation S109, the application streaming manager 220 requests the entire streaming so as to stream the entire application. In this case, the application streaming manager 220 begins receiving the application by beginning to stream the entire application in the background S112. Then, the process proceeds to operation S104 to execute the application.

FIG. 4 is a flowchart illustrating a method for providing a streaming-based portable application under a kernel level of an operating system.

Referring to FIG. 4, when an application is under execution in operation S201, a kernel of an operating system 420 checks whether an application execution page is mapped to a memory of the operating system 420 in operation S202.

When it is determined that the application execution page is mapped to the memory of the operating system 420, the application execution state is maintained.

In operation S203, when it is determined that the application execution page is not mapped to the memory of the operating system 420, the kernel of the operating system 420 requests the application execution page to a file system. In operations S204 and S205, the portable application kernel engine 210 intercepts the request of the application execution page, and checks the execution application type to thereby determine whether the execution application type is application streaming or a portable application.

In operation S206, when the execution application type is determined as the portable application, the portable application kernel engine 210 reads a corresponding execution page, which is stored in a specific location of a local file, from the cache 430 because the cache 430 of the corresponding execution page surely exists. Then, the process returns to operation S201 to continue to execute the application.

In operation S207, when the execution application type is determined as the application streaming, the portable application kernel engine 210 determines whether the cache 430 of the corresponding execution page exits. When it is determined that the cache 430 exists, the portable application kernel engine 210 proceeds to operation S260 of reading the corresponding execution page from the cache 430.

In operation S208, when it is determined that the cache 430 does not exist, the portable application kernel engine 210 notifies the application streaming manger 220 that the cache 430 of the corresponding execution page does not exist. In operation S209, the application streaming manager 220 receives the notification of the portable application kernel engine 210 to request the streaming server 100 to transmit the corresponding execution page through the network 300, thereby receiving the corresponding execution page. The received application execution page may be stored in the cache 430 for the purpose of future use, or may not be stored for one-time use of the application.

In operation S210, the application streaming manager 220 determines whether to store the received application execution page in the cache 430. In operation S211, when it is determined to store the received application execution page, the application streaming manager 220 stores the corresponding application execution page in the designated cache 430.

In operation S212, the application streaming manager 220 determines whether the entire application is completely stored or not. In operations S213 and S214, when it is determined that the entire application is completely stored, the application streaming manager 220 sets the corresponding application from the application streaming to the portable application, and then notifies the reception result of the application execution page to the portable application kernel engine 210. In operation S215, the portable application kernel engine 210 continues to execute the application.

On the other hand, when it is determined not to store the received application execution page in operation S210, the application streaming manager 220 proceeds to operation S214 to notify the reception result of the application execution page to the portable application kernel engine 210.

When it is determined that the entire application is not completely stored in operation S212, the application streaming manager 220 proceeds to operation S214 to notify the reception result of the application execution page to the portable application kernel engine 210.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Industrial Applicability

The system and method for providing the streaming-based portable application according to the embodiments of the present invention can add and update the portable application in one click, without separate procedures, by using advantages of the application streaming while maintaining advantages of the portable application. The system and method according to the embodiments of the present invention can be variously applied to portable application fields that add and update the portable application in one click, without separate procedures.

The invention claimed is:

1. A system for providing a streaming-based portable application under selective conditions, the system comprising:
 a streaming server configured to store an application execution code provided inside of the system necessary to execute a portable application; and
 a client configured to provide a virtualization of the application execution code, streaming the application execution code from the streaming server through a network, and managing streamed application images, the client comprising:
 a memory;
 a portable application kernel engine configured to provide the virtualization of the application execution code necessary to execute the portable application, and executing a portable application service;
 an application manager configured to manage the streamed application images;
 an application streaming manager configured to stream the application execution code from the streaming server according to a request of the portable application kernel engine or the application manager;
 a cache configured to store the application execution code received from the streaming server; and
 an operating system in which the portable application kernel engine is embedded,
 wherein the application manager manages the portable application such that an initial execution of the portable application is differently performed according to conditions, the conditions including each of a case where the portable application is completely stored in the cache, a case where the portable application is not completely stored, a case where a user wants to stream the execution code of the portable application at a time, and a case where the user wants to stream the execution code of the portable application whenever necessary, and
 wherein the portable application kernel engine reads the application execution code from the cache when an execution application type is the portable application, and continues to execute the portable application, notifies the application streaming manager of a non-existence of the cache of the corresponding execution code when the execution application type is for application streaming of the portable application and when the corresponding execution page does not exist in the cache, requests the streaming server to transmit the corresponding application execution code through the network, and receives the corresponding execution page, and stores the entire application execution code in the cache, sets the corresponding application execution code from the application streaming to the portable application, notifies the application streaming manager of the reception result of the application execution code, and continues to execute the application.

2. The system of claim 1, wherein the application execution code received from the streaming server is stored in the cache for future use and is not stored for onetime use of the application.

\* \* \* \* \*